(12) United States Patent
Heo

(10) Patent No.: US 12,003,645 B2
(45) Date of Patent: Jun. 4, 2024

(54) METHOD AND APPARATUS FOR CREATING BLOCKS IN BLOCKCHAIN SYSTEM

(71) Applicant: ELECTRONICS AND TELECOMMUNICATIONS RESEARCH INSTITUTE, Daejeon (KR)

(72) Inventor: Hwanjo Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 301 days.

(21) Appl. No.: 17/358,470

(22) Filed: Jun. 25, 2021

(65) Prior Publication Data
US 2021/0409224 A1 Dec. 30, 2021

(30) Foreign Application Priority Data
Jun. 29, 2020 (KR) .................. 10-2020-0078992

(51) Int. Cl.
*H04L 9/32* (2006.01)
*H04L 9/08* (2006.01)
*H04L 9/14* (2006.01)
*H04L 9/00* (2022.01)

(52) U.S. Cl.
CPC .......... *H04L 9/3236* (2013.01); *H04L 9/0825* (2013.01); *H04L 9/14* (2013.01); *H04L 9/3247* (2013.01); *H04L 9/50* (2022.05)

(58) Field of Classification Search
CPC ... H04L 9/3236; H04L 9/0825; H04L 9/3247; H04L 9/50
See application file for complete search history.

(56) References Cited

U.S. PATENT DOCUMENTS

| 2018/0062764 | A1 | 3/2018 | Borrill |
| 2018/0198794 | A1 | 7/2018 | Huh et al. |
| 2018/0300382 | A1 | 10/2018 | Madisetti et al. |
| 2019/0182313 | A1 | 6/2019 | Yoo et al. |
| 2019/0378127 | A1* | 12/2019 | Dudar .................... H04L 9/0637 |
| 2020/0228349 | A1* | 7/2020 | Basu ...................... H04L 9/3255 |
| 2020/0322175 | A1* | 10/2020 | Chen ...................... H04L 9/3066 |
| 2020/0327537 | A1* | 10/2020 | Garg ...................... H04L 9/3247 |

(Continued)

FOREIGN PATENT DOCUMENTS

| CN | 111147249 A | * | 12/2020 | ............. G06F 21/62 |
| CN | 113556237 A | * | 10/2021 | ............... H04L 9/32 |

(Continued)

OTHER PUBLICATIONS

Dan Boneh, et al., "Short signatures from the Weil Pairing", J. Cryptology (2004) 17: 297-319.

(Continued)

*Primary Examiner* — Darshan I Dhruv
(74) *Attorney, Agent, or Firm* — LRK PATENT LAW FIRM

(57) ABSTRACT

A block production method and a block producing node including creating an entangled transaction list by combining a plurality of transactions received through the communication unit and producing a block using the entangled transaction list are provided.

14 Claims, 7 Drawing Sheets

(56) References Cited

U.S. PATENT DOCUMENTS

2021/0049600 A1* 2/2021 Spector .................. H04L 9/085
2021/0099312 A1* 4/2021 Guo ....................... G06F 16/00

FOREIGN PATENT DOCUMENTS

| EP | 3496027 A1 | 6/2019 |
| KR | 10-2019-0023894 A | 3/2019 |
| KR | 10-1995316 B1 | 10/2019 |

OTHER PUBLICATIONS

Stoshi Nakamoto, "Bitcoin: A peer-to-peer electronic cash system", 2008.

Eric Lombrozo, et al., "Segregated witness (consensus layer)", Bitcoin Core Develop. Team, Tech. Rep. BIP, 2015.

* cited by examiner

FIG. 3

| $(SD_1, UD_1, PK_1)$ |
| $(SD_2, UD_2, PK_2)$ |
| ... |
| $(SD_n, UD_n, PK_n)$ |
| $\sigma$ |

METHOD AND APPARATUS FOR CREATING BLOCKS IN BLOCKCHAIN SYSTEM

CROSS-REFERENCE TO RELATED APPLICATION

This application claims priority to and the benefit of Korean Patent Application No. 10-2020-0078992 filed in the Korean Intellectual Property Office on Jun. 29, 2020, the entire contents of which are incorporated herein by reference.

BACKGROUND OF THE INVENTION

1. Field of the Invention

This description relates to a method and an apparatus for producing blocks using an entangled transaction list.

2. Description of Related Art

In a blockchain system, one block has a list of transactions, and each transaction contains signature information based on public key (public key infrastructure, PKI). Public key-based signature information can be verified using the public key. However, since the signature information increases the size of the transaction to increase the size of the block, a method for reduce the space occupied by the signature in the block is being studied.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present description has been made in an effort to provide a method and an apparatus for producing blocks using an entangled transaction list.

An embodiment provides an intermediate node of a blockchain system.

Another embodiment provides a block producing node of a blockchain system.

Yet another embodiment provides a block producing node of a blockchain system.

According to an embodiment, an intermediate node of a blockchain system is provided. The intermediate node includes a processor, a memory, and a communication unit, wherein the processor executes a program stored in the memory to perform: creating an entangled transaction list by combining a plurality of transactions received through the communication unit; and transferring the entangled transaction list to a block producing node or another intermediate node.

When the processor performs the creation of the entangled transaction list by combining a plurality of transactions received through the communication unit, the processor may perform creating the entangled transaction list by combining first transaction and second transaction received through the communication unit.

When the processor performs the creation of the entangled transaction list by combining a plurality of transactions received through the communication unit, the processor may perform creating the entangled transaction list by combining a first transaction list including a plurality of transactions with first transaction which are received through the communication unit.

When the processor performs the creation of the entangled transaction list by combining a plurality of transactions received through the communication unit, the processor may perform creating the entangled transaction list by combining a first transaction list including a plurality of transactions and a second transaction list including a plurality of other transactions which are different from the plurality of transactions received through the communication unit.

When the processor performs the creation of the entangled transaction list by combining a plurality of transactions received through the communication unit, the processor may perform aggregating a first signature of first transaction among the plurality of transactions by a second signature of second transaction among the plurality of transactions.

According to another embodiment, a block producing node of a blockchain system is provided. The block producing node includes a processor, a memory, and a communication unit, wherein the processor executes a program stored in the memory to perform: verifying an entangled signature in an entangled transaction list received from an intermediate node of the blockchain system through the communication unit; and producing a block by inserting the entangled signature into a block header of the block when the entangled signature is verified.

When the processor performs the verification of the entangled signature in an entangled transaction list received from an intermediate node of the blockchain system through the communication unit, the processor may perform verifying the entangled signature to collectively verify entire transactions included in the entangled transaction list.

When the processor performs the production of the block by inserting the entangled signature into a block header of the block when the entangled signature is verified, the processor may perform calculating a transaction hash value based on an ordered list of data of transaction included in the entangled transaction list, an ordered list of public keys, and an ordered list of additional data that do not require a signature verification.

According to yet another embodiment, a block producing node of a blockchain system is provided. The block producing node includes a processor, a memory, and a communication unit, wherein the processor executes a program stored in the memory to perform: creating an entangled transaction list by combining a plurality of transactions received through the communication unit; verifying an entangled signature of the entangled transaction list; and producing a block by inserting the entangled signature into a block header of the block when the entangled signature is verified.

When the processor performs the creation of the entangled transaction list by combining a plurality of transactions received through the communication unit, the processor may perform creating the entangled transaction list by combining first transaction and second transaction received through the communication unit.

When the processor performs the creation of the entangled transaction list by combining a plurality of transactions received through the communication unit, the processor may perform creating the entangled transaction list by combining a first transaction list including a plurality of transactions with first transaction which are received through the communication unit.

When the processor performs the creation of the entangled transaction list by combining a plurality of transactions received through the communication unit, the processor may perform creating the entangled transaction list by combining a first transaction list including a plurality of transactions and a second transaction list including a plurality of other transactions which are different from the plurality of transactions received through the communication unit.

When the processor performs the creation of the entangled transaction list by combining a plurality of transactions received through the communication unit, the processor may perform aggregating a first signature of first transaction among the plurality of transactions by a second signature of second transaction among the plurality of transactions.

When the processor performs the verification of the entangled signature of the entangled transaction list, the processor may perform verifying the entangled signature to collectively verify entire transactions included in the entangled transaction list.

When the processor performs the production of the block by inserting the entangled signature into a block header of the block when the entangled signature is verified, the processor may perform calculating a transaction hash value based on an ordered list of data of a transaction included in the entangled transaction list, an ordered list of public keys, and an ordered list of data that do not require a signature verification.

When the processor performs the production of the block by inserting the entangled signature into a block header of the block when the entangled signature is verified, the processor may perform calculating a transaction hash value based on an ordered list of data of a transaction included in the entangled transaction list, an ordered list of public keys, an ordered list of data that do not require a signature verification, and the entangled signature.

BRIEF DESCRIPTION OF THE DRAWINGS

FIG. 3 is a diagram illustrating an entangled transaction list according to an embodiment.

DETAILED DESCRIPTION OF THE EMBODIMENTS

Figure 1:
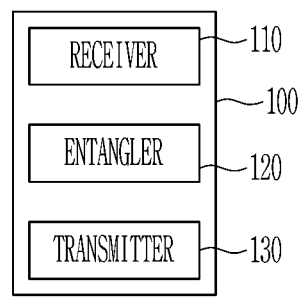
FIG. 1 is a block diagram illustrating an intermediate node included in a blockchain system according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

Figure 2:
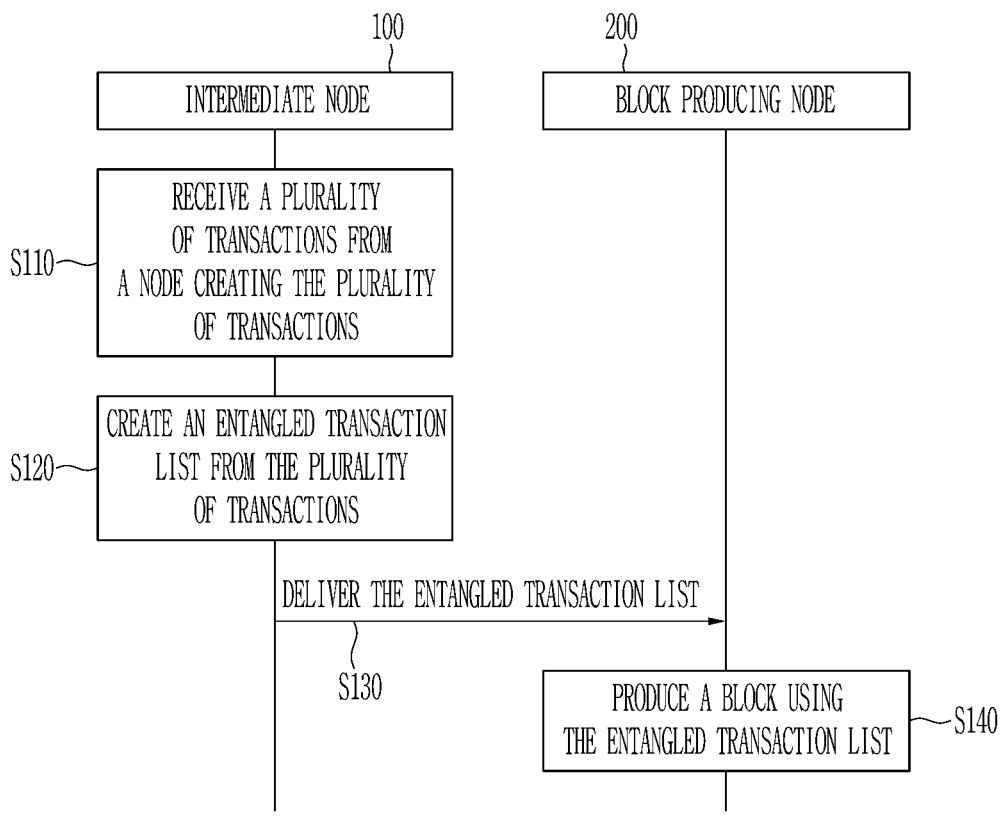
FIG. 2 is a flowchart illustrating a block production method of the blockchain system according to an embodiment.
Figure 3:
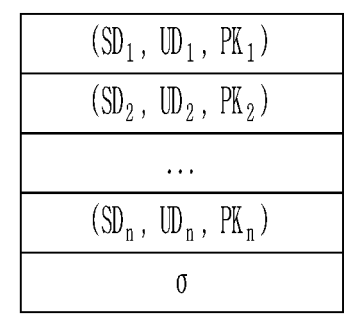

FIG. 1 is a block diagram illustrating an intermediate node included in a blockchain system according to an embodiment, FIG. 2 is a flowchart illustrating a block production method of the blockchain system according to an embodiment, and FIG. 3 is a diagram illustrating an entangled transaction list according to an embodiment.

An intermediate node 100 according to an embodiment may include a receiver 110, an entangler 120, and a transmitter 130. The intermediate node 100 may process a transaction created by a node initially creating the transaction in a form of entangled transaction and transfer a list of the entangled transactions (the entangled transaction list) to a block producing node that produces blocks of the blockchain system. According to the embodiment, since a signature (e.g., BLS (Boneh-Lynn-Shacham) signature) used to record transactions in the block may be combined without a secret key, the intermediate node 100 located in the position between the transaction creation node and the block producing node may be also capable of combining digital signatures.

The receiver 110 may receive a plurality of transactions from a node creating a plurality of transactions. In general, the receiver 110 may receive one transaction from one transaction creation node, where each of a plurality of transaction creation nodes may transfer one transaction to the intermediate node 100.

The entangler 120 may create an entangled transaction list from the plurality of transactions. The entangler 120 may combine one transaction with another transaction to create a single entangled transaction list including two transactions. Alternatively, the entangler 120 may combine a transaction list including n transactions with a single transaction to create a single entangled transaction list including n+1 transactions. Alternatively, the entangler 120 may combine a transaction list including n transactions and another transaction list including m transactions to create a single entangled transaction list including n+m transactions. Alternatively, the entangler 120 may combine an entangled transaction list including n transactions and a transaction list including m transactions to create a single entangled transaction list including n+m transactions. Alternatively, the entangler 120 may combine an entangled transaction list including n transactions and another entangled transaction list including m transactions to create a single entangled transaction list including n+m transactions. However, the entangler 120 may choose not to create a transaction list including n+m transactions by combining a transaction list including n transactions and an entangled transaction list including m transactions.

The transmitter 130 may transmit the entangled transaction list to another intermediate node or a block producing node. That is, the plurality of transactions generated by the plurality of transaction creation nodes may be aggregated into the entangled transaction list by the intermediate node 100 and then propagated in the blockchain system in the form of the entangled transaction list.

Referring to FIG. 2, the receiver 110 of the intermediate node 100 may receive a plurality of transactions from a plurality of transaction creation nodes (S110). In general, an unordered list of n transactions $\{T_1, T_2, \ldots, T_n\}$ may be expressed as Table 1 below.

TABLE 1

| |
|---|
| $(SD_1, UD_1, PK_1, \Sigma_1)$ |
| $(SD_2, UD_2, PK_2, \Sigma_2)$ |
| ... |
| $(SD_n, UD_n, PK_n, \Sigma_n)$ |

As shown in Table 1, the i-th transaction (T) among n transactions may be generalized and expressed as Equation 1 below.

$(SD_i, UD_i, PK_i, \Sigma_i)$ (Equation 1)

In equation 1, $SD_i$ is an ordered list of data that needs signature verification, and is as shown in equation 2 below.

$SD_i = \{sd_{i,j}\}$ for $j=1, \ldots, k$ (Equation 2)

In equation 1, $PK_i$ is an ordered list of public keys, as shown in equation 3 below.

$PK_i = \{pk_{i,j}\}$ for $j=1, \ldots, k$ (Equation 3)

In equation 1, $\Sigma_i$ is an ordered list of signatures that are verified using the public key, as shown in equation 4 below.

$\Sigma_i = \{\sigma_{i,j}\}$ for $j=1, \ldots, k$ (Equation 4)

In equation 1, $UD_i$ is an ordered list of all data that do not require the signature verification, as shown in equation 5 below.

$UD_i = \{ud_{i,j}\}$ for $j=1, \ldots, l$ (Equation 5)

In equations 2 to 5, $n(SD_i)=n(PK_i)=n(\Sigma_i)=k$, and verification Verify($pk_{i,j}$, $sd_{i,j}$, $\sigma_{i,j}$) of individual signature data in the transaction list may be performed through verification of equation 6 below.

$e(\sigma_{i,j}, g_2) = e(H(sd_{i,j}), pk_{i,j})$ (Equation 6)

The signature of each transaction may be determined as follows. Hereinafter, a BLS signature scheme based on pairing will be described as an example.

When there is non-degenerate pairing $e: \mathbb{G}_1 \times \mathbb{G}_2 \to \mathbb{G}_t$ which is efficiently computable, the BLS signature scheme may include the following steps. Here, $\mathbb{G}_1$, $\mathbb{G}_2$, and $\mathbb{G}_t$ are groups with prime order q. $g_1$ and $g_2$ are the generators of $\mathbb{G}_1$ and $\mathbb{G}_2$, respectively.

1. Generating a key pair (sk, pk): Generate a random secret key $sk \leftarrow \mathbb{Z}_q$, and generate a public key $pk \leftarrow g_2^{sk} \in \mathbb{G}_2$.
2. Generation of signature Sign(sk, n): $\sigma \leftarrow H(m)^{sk} \in \mathbb{G}_1$, where H(m) is a hash function, and H: $\mathcal{M} \to \mathbb{G}_1$. Where n is equivalent to SD in equation 2.
3. Performing of verification Verify(pk, m, $\sigma$): accept if $e(\sigma, g_2) = e(H(m), pk)$, otherwise reject Next, the entangler 120 may create an entangled transaction list from a plurality of transactions (S120). The entangler 120 according to an embodiment may determine the entangled signature $\sigma$ as shown in Equation 7 below when there are n number of $(pk_i, m_i, \sigma_i)_S$ (for i 12, ..., n).

$\sigma \leftarrow \sigma_1 \sigma_2 \ldots \sigma_n \in \mathbb{G}_1$ (Equation 7)

Then, the combined signature $\sigma$ may be verified as in Equation 8 below.

$$e(\sigma, g_2) = \prod_{i=1}^{n} e(H(m_i), pk_i)$$ (Equation 8)

According to an embodiment, the Entangler 120 cannot split the entangled transaction list to make some of the transactions included in the split entangled transaction list into a new list. This is because signature information of individual transactions is not included in the entangled transaction list. Therefore, when the entangled transaction list is transferred, atomicity of the entangled transaction list may be enforced so that all transactions included in the entangled transaction list are transmitted or not transmitted together.

On the other hand, when a specific transaction $T_i$ (or signature information of the specific transaction $\Sigma_i$) included in the entangled transaction list $\{T_1', T_2', \ldots, T_n'\}$ is known, an entangled transaction list $\{T_1', T_2', \ldots, T_n'\} - \{T_i'\}$ of the remaining transactions excluding the specific transaction $T_i$ can be calculated. If the combined entire signature U and the signature $\Sigma_i = \{\sigma_{i,j}\}$ for $j=1, \ldots k$ of the transaction $T_i$ are known, then the combined signature of the entangled transaction list $\{T_1', T_2', \ldots, T_n'\} - \{T_i'\}$ is $\sigma \cdot (\Pi \sigma_{i,j})^{-1}$.

Next, the transmitter 130 may transfer the entangled transaction list to the block producing node 200 (S130). FIG. 2 shows a process in which the transmitter 130 transfers the entangled transaction list to the 'block producing node 200', but the transmitter 130 may transfer the entangled transaction list to another intermediate node. The transmitter 130 may transfer the transaction list in a smaller size than the conventional one. This is because the entangled transaction list transferred by the transmitter 130 may include entangled signatures of all signatures of each transaction, not all signatures of each of the transaction. For example, when the size of one signature is O($\kappa$) ($\kappa$ is a security parameter), the size of n signatures is O(n$\kappa$), but the total size of signatures transferred when using entangled signatures is O($\kappa$).

The block producing node 200 may produce a block using the entangled transaction list (S140). Referring to FIG. 3, a single entangled transaction list may include n entangled transactions and an entangled signatures $\sigma$ for the n entangled transactions. The entangled signature $\sigma$ in FIG. 3 is as in equation 9 below.

$\sigma = \Pi \sigma_i$ for all $\sigma_i \in \Sigma_1 \cup \Sigma_2 \cup \ldots \cup \Sigma_n$ (Equation 9)

Information contained in the entangled transaction list in FIG. 3 may not be used for verification for individual signature data or individual transaction, and the information in the entangled transaction list may be used for verification for the entire signature data. Equation 10 below may show a verification method for the entire signature data (i.e., the entangled signature) in the entangled transaction list using the information in the entangled transaction list.

$$e(\sigma, g_2) = \Pi e(H(sd_{i,j}), pk_{i,j}) \text{ for all } i,j \qquad \text{(Equation 10)}$$

Figure 4:
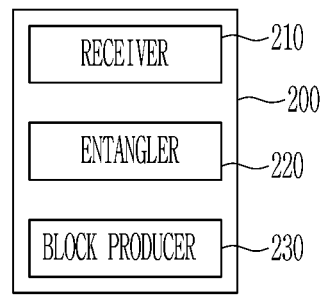
FIG. 4 is a block diagram illustrating a block producing node included in the blockchain system according to another embodiment.
Figure 5:
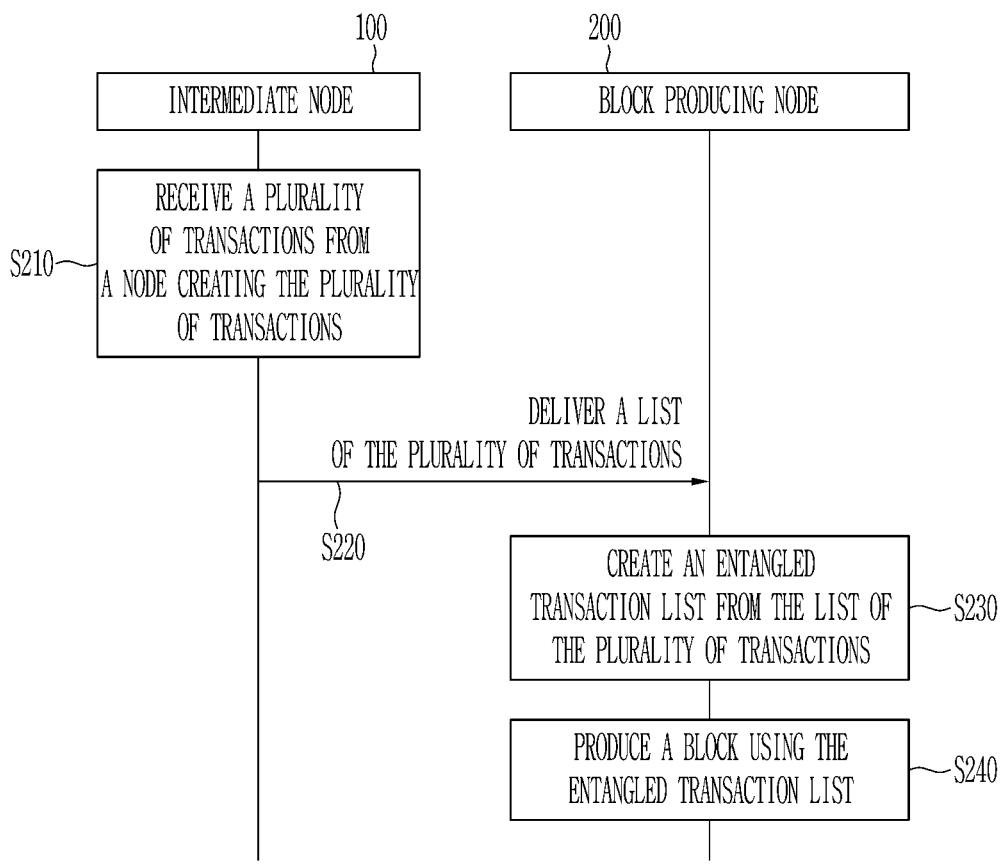
FIG. 5 is a flowchart illustrating a block production method of the blockchain system according to another embodiment.
Figure 6:
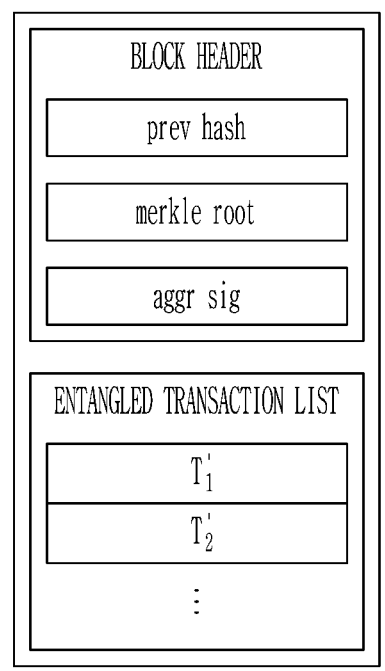
FIG. 6 is a schematic view illustrating a block according to another embodiment.

FIG. 4 is a block diagram illustrating a block producing node included in the blockchain system according to another embodiment, FIG. 5 is a flowchart illustrating a block production method of the blockchain system according to another embodiment, and FIG. 6 is a schematic view illustrating a block according to another embodiment.

Referring to FIG. 4, a block producing node 200 of the blockchain system according to another embodiment may include a receiver 210, an entangler 220, and a block producer 230.

The receiver 210 may receive a transaction or a list of transactions from a transaction creation node or an intermediate node (S210).

The entangler 220 may create an entangled transaction list from the transaction or the transaction list received from the transaction creation node or the intermediate node (S220, S230). The method for creating the entangled transaction list by the entangler 220 may be the same as the method for creating the entangled transaction list of the entangler 120.

The block producer 230 may perform verification of the entangled transaction list and may produce a block using the entangled transaction list for which the verification has been completed. The block producer 230 may produce the block by using the at least one entangled transaction list for which the verification has been completed (S240). In the block produced by the block producer 230, the entire transaction in the transaction list which is entangled using the entangled signature may be collectively verified.

The block produced by the block producer 230 may include a block header and the entangled transaction list. Referring to FIG. 6, the block header may include a Merkle root consisting of a hash value of a previous block (prev hash) and a transaction hash value. The Merkle root may be a root value of a Merkle tree. In addition, the block header may further include the entangled signature σ of the entangled transaction list. Alternatively, the entangled signature σ may be included in a specific position within an aggregated signature (aggregated signature, aggr sig) block.

As for a transaction hash value computation for a Merkle tree, the transaction hash value may be calculated based on an ordered list of data, an ordered list of the public keys, and an ordered list of data that does not require the signature verification of each transaction in the entangled transaction list, that is, based on ($SD_i$, $UD_i$, $PK_i$). A typical non-entangled transaction may be constructed as ($SD_i$, $UD_i$, $PK_i$, $\Sigma_i$) containing the signature information, but the i-th transaction $T_i'$ in the entangled transaction list according to the embodiment may be ($SD_i$, $UD_i$, $PK_i$). This is because the signature information $\Sigma_i$ of each transaction may be separately included in the block header or the aggregated signature block as an entangled signature c. Alternatively, the block producer 230 may calculate the transaction hash value based on the ordered list of data, the ordered list of the public keys, the ordered list of data that does not require the signature verification of each transaction in the entangled transaction list, and the entangled signatures a.

The block producer 230 cannot add a subset of transactions included in the entangled transaction list to the block. This is because the signature information of individual transactions is not included in the entangled transaction list. Therefore, when the entangled transaction list is included in the block, atomicity of the entangled transaction list may be enforced so that all transactions included in the entangled list are included or not included together.

As explained above, the size of the list of transactions transferred by using the entangled signature may be reduced. In addition, since the intermediate node or the block producing node cannot transfer only a subset of transactions or insert a subset of transactions into the block, the atomicity can be guaranteed for the transaction list.

Figure 7:
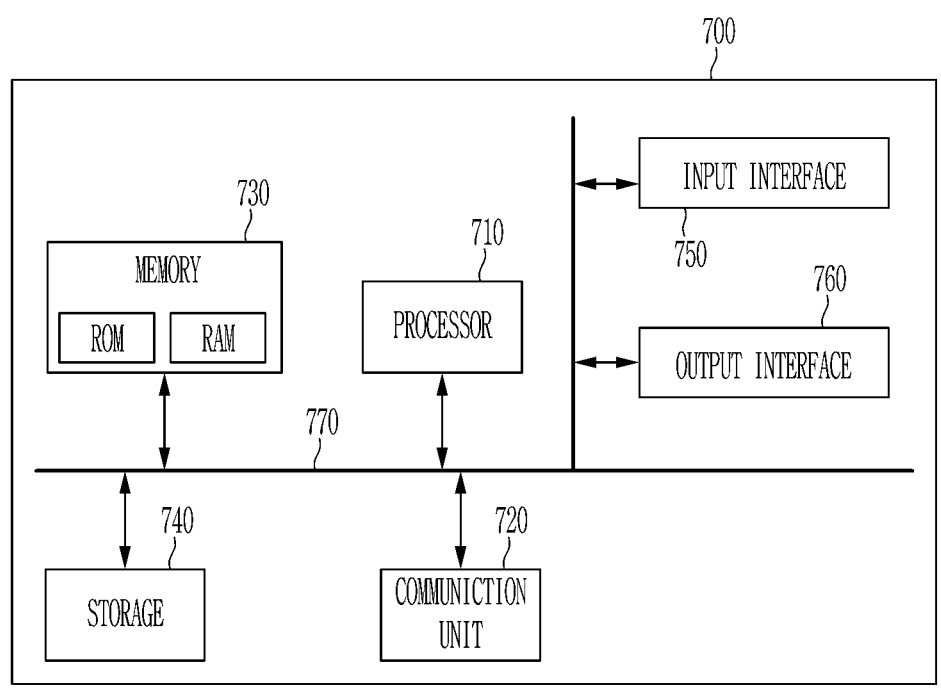
FIG. 7 is a block diagram illustrating a node of a blockchain system according to another embodiment.

FIG. 7 is a block diagram illustrating a node of a blockchain system according to another embodiment.

A node (an intermediate node or a block producing node) of a blockchain system according to an embodiment may be implemented as a computer system, for example, a computer-readable medium. Referring to FIG. 7, the computer system 700 may include at least one of a processor 710, a memory 730, an input interface device 750, an output interface device 760, and a storage device 740 communicating through a bus 770. The computer system 700 may also include a communication device 720 coupled to the network. The processor 710 may be a central processing unit (CPU) or a semiconductor device that executes instructions stored in the memory 730 or the storage device 740. The memory 730 and the storage device 740 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 720 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. An intermediate node of a blockchain system, the intermediate node comprising:
a processor, a memory, and a communication unit, wherein the processor executes a program stored in the memory to perform:

creating an entangled transaction list by combining a plurality of transactions received through the communication unit; and transferring the entangled transaction list to a block producing node or another intermediate node, wherein the entangled transaction list includes entangled signatures of all signatures of each transaction, wherein the entangled signature verifies the plurality of transactions in the entangled transaction list, and wherein the information in the entangled transaction list verifies the entangled signature.

2. The intermediate node of claim 1, wherein when the processor performs the creating an entangled transaction list by combining a plurality of transactions received through the communication unit, the processor performs creating the entangled transaction list by combining first transaction and second transaction received through the communication unit.

3. The intermediate node of claim 1, wherein when the processor performs the creating an entangled transaction list by combining a plurality of transactions received through the communication unit, the processor performs creating the entangled transaction list by combining a first transaction list including a plurality of transactions with first transaction which are received through the communication unit.

4. The intermediate node of claim 1, wherein when the processor performs the creating an entangled transaction list by combining a plurality of transactions received through the communication unit, the processor performs creating the entangled transaction list by combining a first transaction list including a plurality of transactions and a second transaction list including a plurality of other transactions which are different from the plurality of transactions received through the communication unit.

5. The intermediate node of claim 1, wherein when the processor performs the creating an entangled transaction list by combining a plurality of transactions received through the communication unit, the processor performs aggregating a first signature of first transaction among the plurality of transactions by a second signature of second transaction among the plurality of transactions.

6. A block producing node of a blockchain system, the block producing node comprising:

a processor, a memory, and a communication unit, wherein the processor executes a program stored in the memory to perform:

verifying an entangled signature in an entangled transaction list received from an intermediate node of the blockchain system through the communication unit; and producing a block by inserting the entangled signature into a block header of the block when the entangled signature is verified, wherein the entangled transaction list includes entangled signatures of all signatures of each transaction, wherein the entangled signature is generated by multiplying all signatures of the plurality of transactions, wherein the information in the entangled transaction list verifies the entangled signature, and wherein when the processor performs the verifying the entangled signature in the entangled transaction list received from an intermediate node of the blockchain system through the communication unit, the processor performs verifying the entangled signature to collectively verify entire transactions included in the entangled transaction list.

7. The block producing node of claim 6, wherein when the processor performs the producing a block by inserting the entangled signature into a block header of the block when the entangled signature is verified, the processor performs calculating a transaction hash value based on an ordered list of data of transaction included in the entangled transaction list, an ordered list of public keys, and an ordered list of additional data that do not require a signature verification.

8. A block producing node of a blockchain system, the block producing node comprising:

a processor, a memory, and a communication unit, wherein the processor executes a program stored in the memory to perform:

creating an entangled transaction list by combining a plurality of transactions received through the communication unit;

verifying an entangled signature of the entangled transaction list; and producing a block by inserting the entangled signature into a block header of the block when the entangled signature is verified, wherein the entangled transaction list includes entangled signatures of all signatures of each transaction, wherein the entangled signature is generated by multiplying all signatures of the plurality of transactions, wherein the information in the entangled transaction list verifies the entangled signature, and wherein when the processor performs the verifying the entangled signature in the entangled transaction list the processor performs verifying the entangled signature to collectively verify entire transactions included in the entangled transaction list.

9. The block producing node of claim 8, wherein when the processor performs the creating an entangled transaction list by combining a plurality of transactions received through the communication unit, the processor performs creating the entangled transaction list by combining first transaction and second transaction received through the communication unit.

10. The block producing node of claim 8, wherein when the processor performs the creating an entangled transaction list by combining a plurality of transactions received through the communication unit, the processor performs creating the entangled transaction list by combining a first transaction list including a plurality of transactions with first transaction which are received through the communication unit.

11. The block producing node of claim 8, wherein when the processor performs the creating an entangled transaction list by combining a plurality of transactions received through the communication unit, the processor performs creating the entangled transaction list by combining a first transaction list including a plurality of transactions and a second transaction list including a plurality of other transactions which are different from the plurality of transactions received through the communication unit.

12. The block producing node of claim 8,
wherein when the processor performs the creating an entangled transaction list by combining a plurality of transactions received through the communication unit, the processor performs
aggregating a first signature of first transaction among the plurality of transactions by a second signature of second transaction among the plurality of transactions.

13. The block producing node of claim 8,
wherein when the processor performs the producing a block by inserting the entangled signature into a block header of the block when the entangled signature is verified, the processor performs
calculating a transaction hash value based on an ordered list of data of a transaction included in the entangled transaction list, an ordered list of public keys, and an ordered list of data that do not require a signature verification.

14. The block producing node of claim 8,
wherein when the processor performs the producing a block by inserting the entangled signature into a block header of the block when the entangled signature is verified, the processor performs
calculating a transaction hash value based on an ordered list of data of a transaction included in the entangled transaction list, an ordered list of public keys, an ordered list of data that do not require a signature verification, and the entangled signature.

* * * * *